US008340893B2

(12) United States Patent
Yamaguchi et al.

(10) Patent No.: US 8,340,893 B2
(45) Date of Patent: Dec. 25, 2012

(54) MOBILE OBJECT SUPPORT SYSTEM

(75) Inventors: Kazuhiko Yamaguchi, Kawasaki (JP); Hiroki Hayashi, Kawasaki (JP); Yusuke Suzuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 261 days.

(21) Appl. No.: 12/569,385

(22) Filed: Sep. 29, 2009

(65) Prior Publication Data

US 2010/0082244 A1 Apr. 1, 2010

(30) Foreign Application Priority Data

Sep. 30, 2008 (JP) ................................. 2008-254355

(51) Int. Cl.
*G06F 17/10* (2006.01)

(52) U.S. Cl. ......................... 701/301; 701/421; 701/422

(58) Field of Classification Search .................. 701/1, 2, 701/8, 421, 422, 301

See application file for complete search history.

(56) References Cited

U.S. PATENT DOCUMENTS

| | | | | |
|---|---|---|---|---|
| 6,377,191 | B1 * | 4/2002 | Takubo | 340/937 |
| 2003/0105587 | A1 * | 6/2003 | Kim | 701/214 |
| 2006/0020389 | A1 | 1/2006 | Yamamoto | |
| 2008/0015772 | A1 * | 1/2008 | Sanma et al. | 701/207 |
| 2008/0084473 | A1 * | 4/2008 | Romanowich | 348/135 |
| 2008/0211779 | A1 * | 9/2008 | Pryor | 345/173 |
| 2008/0297488 | A1 * | 12/2008 | Operowsky et al. | 345/173 |
| 2009/0267801 | A1 * | 10/2009 | Kawai et al. | 340/988 |
| 2010/0033571 | A1 * | 2/2010 | Fujita et al. | 348/149 |
| 2010/0128127 | A1 * | 5/2010 | Ciolli | 348/143 |
| 2011/0037725 | A1 * | 2/2011 | Pryor | 345/174 |

FOREIGN PATENT DOCUMENTS

| | | | |
|---|---|---|---|
| DE | 102007032814 | A1 | 1/2008 |
| EP | 2110797 | A1 | 10/2009 |
| JP | 10097700 | A | 4/1998 |
| JP | 2001307291 | A | 11/2001 |
| JP | 2004310189 | A | 11/2004 |
| JP | 200631072 | | 2/2006 |
| JP | 200647291 | | 2/2006 |
| JP | 2006295325 | | 10/2006 |
| WO | 2008068837 | A1 | 6/2008 |

OTHER PUBLICATIONS

Extended European Search Report dated Jan. 8, 2010 in corresponding Application No. 09171565.6-2215.

Notice of Reasons for Refusal dated Nov. 6, 2012 for corresponding Japanese Application No. 2008-254355.

* cited by examiner

*Primary Examiner* — Hussein A. Elchanti

(74) *Attorney, Agent, or Firm* — Murphy & King, P.C.

(57) ABSTRACT

An apparatus mounted on a mobile object includes a first receiver for receiving a plurality of information regarding a move of the mobile object, a second receiver for receiving identification information determining a moving position of the mobile object, and a display for displaying indication information in the plurality of the information regarding the move of the mobile object received by the first receiver on the basis of the identification information received by the second receiver.

7 Claims, 15 Drawing Sheets

FIG. 7

| CONNECTION NUMBER | PID | CONTENT OF INFORMATION |
|---|---|---|
| 1 | 0x1001 | VIDEO IMAGE ACQUIRED BY CAMERA 210 |
| 2 | 0x1002 | VIDEO IMAGE ACQUIRED BY CAMERA 220 |
| 3 | 0x1003 | VIDEO IMAGE ACQUIRED BY CAMERA 230 |
| 4 | 0x1004 | VIDEO IMAGE ACQUIRED BY CAMERA 240 |
| 5 | 0x1011 | VIDEO IMAGE ACQUIRED BY PEDESTRIAN SENSOR 310 |
| 6 | 0x1012 | VIDEO IMAGE ACQUIRED BY PEDESTRIAN SENSOR 320 |
| 7 | 0x1013 | VIDEO IMAGE ACQUIRED BY PEDESTRIAN SENSOR 330 |
| 8 | 0x1014 | VIDEO IMAGE ACQUIRED BY PEDESTRIAN SENSOR 340 |

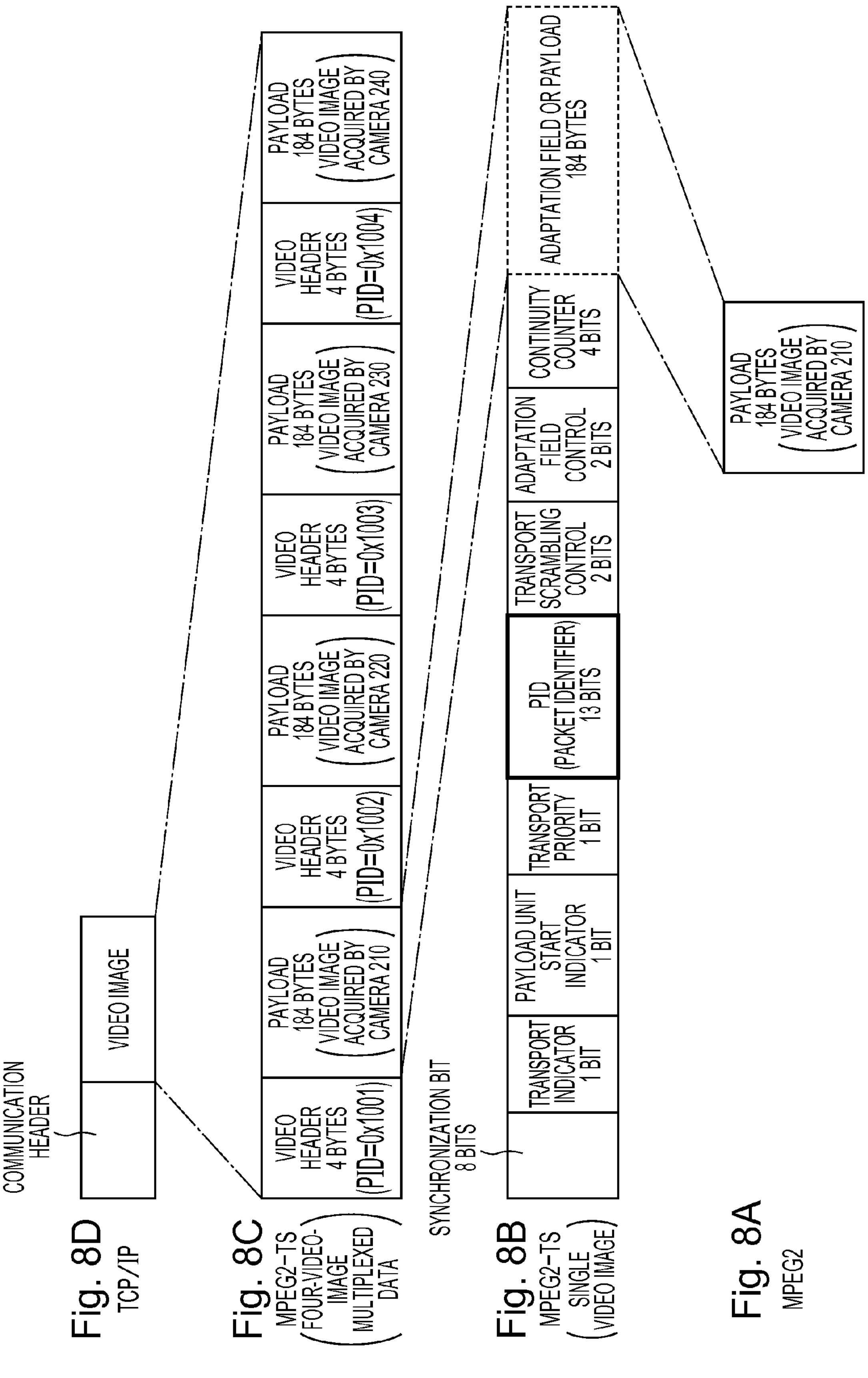
Fig. 8D
TCP/IP
COMMUNICATION HEADER
VIDEO IMAGE
Fig. 8C
MPEG2-TS (FOUR-VIDEO-IMAGE MULTIPLEXED DATA)
VIDEO HEADER 4 BYTES (PID=0x1001)
PAYLOAD 184 BYTES (VIDEO IMAGE ACQUIRED BY CAMERA 210)
VIDEO HEADER 4 BYTES (PID=0x1002)
PAYLOAD 184 BYTES (VIDEO IMAGE ACQUIRED BY CAMERA 220)
VIDEO HEADER 4 BYTES (PID=0x1003)
PAYLOAD 184 BYTES (VIDEO IMAGE ACQUIRED BY CAMERA 230)
VIDEO HEADER 4 BYTES (PID=0x1004)
PAYLOAD 184 BYTES (VIDEO IMAGE ACQUIRED BY CAMERA 240)
Fig. 8B
MPEG2-TS (SINGLE VIDEO IMAGE)
SYNCHRONIZATION BIT 8 BITS
TRANSPORT INDICATOR 1 BIT
PAYLOAD UNIT START INDICATOR 1 BIT
TRANSPORT PRIORITY 1 BIT
PID (PACKET IDENTIFIER) 13 BITS
TRANSPORT SCRAMBLING CONTROL 2 BITS
ADAPTATION FIELD CONTROL 2 BITS
CONTINUITY COUNTER 4 BITS
ADAPTATION FIELD OR PAYLOAD 184 BYTES
Fig. 8A
MPEG2
PAYLOAD 184 BYTES (VIDEO IMAGE ACQUIRED BY CAMERA 210)

FIG. 9

| RFID | TAG INFORMATION | INFORMATION TO BE DISPLAYED |
|---|---|---|
| 701 | 0x1001<br>0x1014 | VIDEO INFORMATION ACQUIRED BY CAMERA 210<br>INFORMATION ACQUIRED BY PEDESTRIAN SENSOR 340 |
| 702 | 0x1011 | INFORMATION ACQUIRED BY PEDESTRIAN SENSOR 310 |
| 703 | 0x1011<br>0x1013 | INFORMATION ACQUIRED BY PEDESTRIAN SENSOR 310<br>INFORMATION ACQUIRED BY PEDESTRIAN SENSOR 330 |

FIG. 12

| RFID | TAG INFORMATION | INFORMATION TO BE DISPLAYED |
|---|---|---|
| 701 | 0x1001<br>0x1014 | VIDEO INFORMATION ACQUIRED BY CAMERA 210<br>INFORMATION ACQUIRED BY PEDESTRIAN SENSOR 340 |
| 702 | 0x1011<br>0x1013 | INFORMATION ACQUIRED BY PEDESTRIAN SENSOR 210<br>INFORMATION ACQUIRED BY PEDESTRIAN SENSOR 330 |
| 703 | 0x1011<br>0x1013 | INFORMATION ACQUIRED BY PEDESTRIAN SENSOR 210<br>INFORMATION ACQUIRED BY PEDESTRIAN SENSOR 330 |

FIG. 13A

| RFID | TAG INFORMATION | TRAFFIC LANE |
|---|---|---|
| 701 | 0x1001 | 111 |
| 702 | 0x1002 | 112 |
| 703 | 0x1003 | 113 |

FIG. 13B

| | PID | CONTENT OF DATA |
|---|---|---|
| 0 | 0x0000 | 1) PID INFORMATION WITH RESPECT TO PACKET TO BE DISPLAYED IN A CASE IN WHICH IDENTIFIER OF RFID MATCHES 0x1001 IN RECEPTION SIDE (IN THE CASE OF THE VEHICLE ON TRAFFIC LANE 111); IN THIS CASE, 0x1001 AND 0x1014<br>2) PID INFORMATION WITH RESPECT TO PACKET TO BE DISPLAYED IN A CASE IN WHICH IDENTIFIER OF RFID MATCHES 0x1002 IN RECEPTION SIDE (IN THE CASE OF THE VEHICLE ON TRAFFIC LANE 112); IN THIS CASE, 0x1011 AND 0x1013<br>3) PID INFORMATION WITH RESPECT TO PACKET TO BE DISPLAYED IN A CASE IN WHICH IDENTIFIER OF RFID MATCHES 0x1003; IN THIS CASE, NONE, BECAUSE TRAFFIC REGULATION HAS BEEN MADE FOR ROAD WORK<br>:<br>:<br>(DEFINITIONS FOR ALL TRAFFIC LANES ARE TRANSMITTED AS NOTICE) |
| 1 | 0x1001 | INFORMATION WITH RESPECT TO CAMERA 210 |
| 2 | 0x1002 | INFORMATION WITH RESPECT TO CAMERA 220 |
| 3 | 0x1003 | INFORMATION WITH RESPECT TO CAMERA 230 |
| 4 | 0x1004 | INFORMATION WITH RESPECT TO CAMERA 240 |
| 5 | 0x1011 | INFORMATION WITH RESPECT TO PEDESTRIAN SENSOR 310 |
| 6 | 0x1012 | INFORMATION WITH RESPECT TO PEDESTRIAN SENSOR 320 |
| 7 | 0x1013 | INFORMATION WITH RESPECT TO PEDESTRIAN SENSOR 330 |
| 8 | 0x1014 | INFORMATION WITH RESPECT TO PEDESTRIAN SENSOR 340 |

FIG. 15

| RFID | DIRECTION OF MOVEMENT | PID OF INFORMATION TO BE DISPLAYED | PREDICTED DIRECTION OF MOVEMENT |
|---|---|---|---|
| 701 | LEFT | 0x1011 | VEHICLE WILL CHANGE TRAFFIC LANE TO TRAFFIC LANE 112, AND GO STRAIGHT AHEAD |
| | NONE | 0x1011<br>0x1014 | ASSUME THAT VEHICLE WILL TURN RIGHT |
| | RIGHT | 0x1001<br>0x1014 | VEHICLE WILL TURN LIGHT |
| 702 | LEFT | 0x1011<br>0x1013 | VEHICLE WILL CHANGE TRAFFIC LANE TO TRAFFIC LANE 113, AND GO STRAIGHT AHEAD OR TURN LEFT |
| | NONE | 0x1011 | VEHICLE WILL GO STRAIGHT AHEAD |
| | RIGHT | 0x1001<br>0x1014 | VEHICLE WILL CHANGE TRAFFIC LANE TO TRAFFIC LANE 111 AND TURN RIGHT |
| 703 | LEFT | 0x1013 | VEHICLE WILL TURN LEFT |
| | NONE | 0x1011 | VEHICLE WILL GO STRAIGHT |
| | RIGHT | 0x1011 | VEHICLE WILL CHANGE TRAFFIC LANE TO TRAFFIC LANE 112 AND GO STRAIGHT AHEAD |

MOBILE OBJECT SUPPORT SYSTEM

CROSS-REFERENCE TO RELATED APPLICATION

This application is based upon and claims the benefit of priority of the prior Japanese Patent Application No. 2008-254355, filed on Sep. 30, 2008, the entire contents of which are incorporated herein by reference.

FIELD

The embodiments discussed herein are related to a mobile object support system.

BACKGROUND

In recent years, there has been an increase in research and development regarding ITS (Intelligent Transport Systems) which transmit/receive information between an infrastructure system and a vehicle or a mobile object (mobile terminal), in order to solve road transportation problems such as traffic accidents, traffic jams, etc. Examples of such system already put to practical use include: an automatic toll collection system which solve traffic jams around toll booths using an ETC (Electric Toll Collection) system; a road traffic information providing service which provide route guidance in cooperation with GPS (Global Positioning System) and a car navigation system in order to solve traffic jams; and a bus location system which enable the current location of a bus to be checked using a mobile terminal and provide notice of the waiting time required at a bus stop.

As described above, such systems have been put to practical use mainly for the purpose of solving traffic jams and displaying route information. In the future, there will be a demand for developing a driving support system which enables the vehicle side to receive and use information transmitted from the infrastructure system in order to prevent traffic accidents.

In this regard, a structure has been devised in which RFID tags which record identification information are embedded in the road surface, and a vehicle reads out and uses the information stored in the RFID tags to prevent traffic accidents. For example, there is a technique in which RFID tags store traffic information such as road work information, road signs, etc., and a vehicle reads out the traffic information thus stored in the RFID tags and displays the traffic information thus read out on a display unit (e.g., Japanese Laid-open Patent Publication No. 2006-31072). Furthermore, there is a technique which enables a vehicle to generate map information in the course of driving along an actual route by reading out identification information stored in RFID tags (e.g., Japanese Laid-open Patent Publication No. 2006-47291).

Moreover, a technique has been proposed in which, in an ad-hoc wireless network which provides wireless communication using multiple terminal apparatuses as relays, identification information stored in RFID tags is used to select effective relay terminal apparatuses (e.g., Japanese Laid-open Patent Publication No. 2006-295325).

FIG. 1 is a diagram which illustrates an example of a driving support system which prevents traffic accidents in the vicinity of an intersection.

The driving support system illustrated in FIG. 1 has a configuration including: four cameras 11, 12, 13, and 14, which acquire images of the intersection zone from different fields of view; four pedestrian sensors 21, 22, 23, and 24, which detect pedestrians crossing at crosswalks; a wireless infrastructure device 30 which acquires the images acquired by the cameras 11, 12, 13, and 14, and the detection results detected by the pedestrian sensors 21, 22, 23, and 24, which multiplexes the images and the detection results thus acquired, and which transmits the data thus multiplexed in multi-address transmission manner; and vehicles 40 which are running along traffic lanes.

FIG. 2 is a block diagram which illustrates the driving support system illustrated in FIG. 1. FIG. 3 is a diagram which illustrates an example of images displayed on a display device mounted on a vehicle.

It should be noted that FIG. 2 illustrates only the components of the wireless infrastructure device 30 and the vehicle 40, which are related to the driving support system. As illustrated in FIG. 2, the wireless infrastructure device 30 includes: a multiplexing unit 31 which acquires four images acquired by the four cameras 11, 12, 13, and 14, and detection results detected by the pedestrian sensors 21, 22, 23, and 24, and multiplexes the acquired images and the detection results so as to generate transmission data; and a transmission unit 32 which transmits, in a multi-address transmission manner using an antenna 33, the transmission data thus generated by the multiplexing unit 31. The vehicle 40 mounts: a vehicle installation wireless device 41 which receives the transmission data using an antenna 43; and a display device 42 which displays images based upon the data received by the vehicle installation wireless device 41.

The transmission data obtained by the wireless infrastructure device 30 by multiplexing the four acquired images acquired by the four cameras 11, 12, 13, and 14 and the four detection results detected by the four pedestrian sensors 21, 22, 23, and 24, is transmitted in a multi-address transmission manner. In each vehicle, upon receiving the transmission data, the four acquired images and the four detection results are acquired based upon the received data, and the acquired images and the detection results thus acquired are itemized and displayed on the display device 42 as illustrated in FIG. 3.

In the example illustrated in FIG. 1, for the driver of the vehicle 40A, which is just about to turn right, the vehicle 40C is in a blind spot because it is hidden by being on the far side of the large-size vehicle 40B on the near side. Accordingly, in some cases, the vehicle 40A could turn right without noticing the vehicle 40C going straight ahead, leading to a risk of collision with the vehicle 40C. With such a driving support system, as illustrated in FIG. 3, the images acquired by the camera 11, 12, 13, and 14 are displayed on the display device 42 mounted on the vehicle 40A. This allows the driver of the vehicle 40A to notice the vehicle 40C, thereby preventing such an accident.

However, with such a structure displaying the four images acquired by the four cameras 11, 12, 13, and 14, as described above, it is difficult for the driver to understand which acquired image corresponds to which particular traffic lane.

SUMMARY

According to an aspect of the invention, an apparatus mounted on a mobile object includes a first receiver for receiving a plurality of information regarding a move of the mobile object, a second receiver for receiving identification information determining a moving position of the mobile object, and a display for displaying indication information in the plurality of the information regarding the move of the mobile object received by the first receiver on the basis of the identification information received by the second receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram which illustrates PIDs registered in an identifier DB.

FIGS. 8A-8D are a diagram which illustrates the data structure of video data and multiplexed data.

FIG. 9 is a diagram which illustrates an example of tag information stored in the RFID tag.

FIG. 12 is a diagram which illustrates an example of tag information stored in the RFID tag.

FIG. 13A is a diagram which illustrates the tag information stored in the RFID tag.

FIG. 13B is a diagram which illustrates the identifiers registered in an identifier DB.

FIG. 15 is a diagram which illustrates tag information stored in the RFID tag.

DESCRIPTION OF EMBODIMENTS

Figure 1:
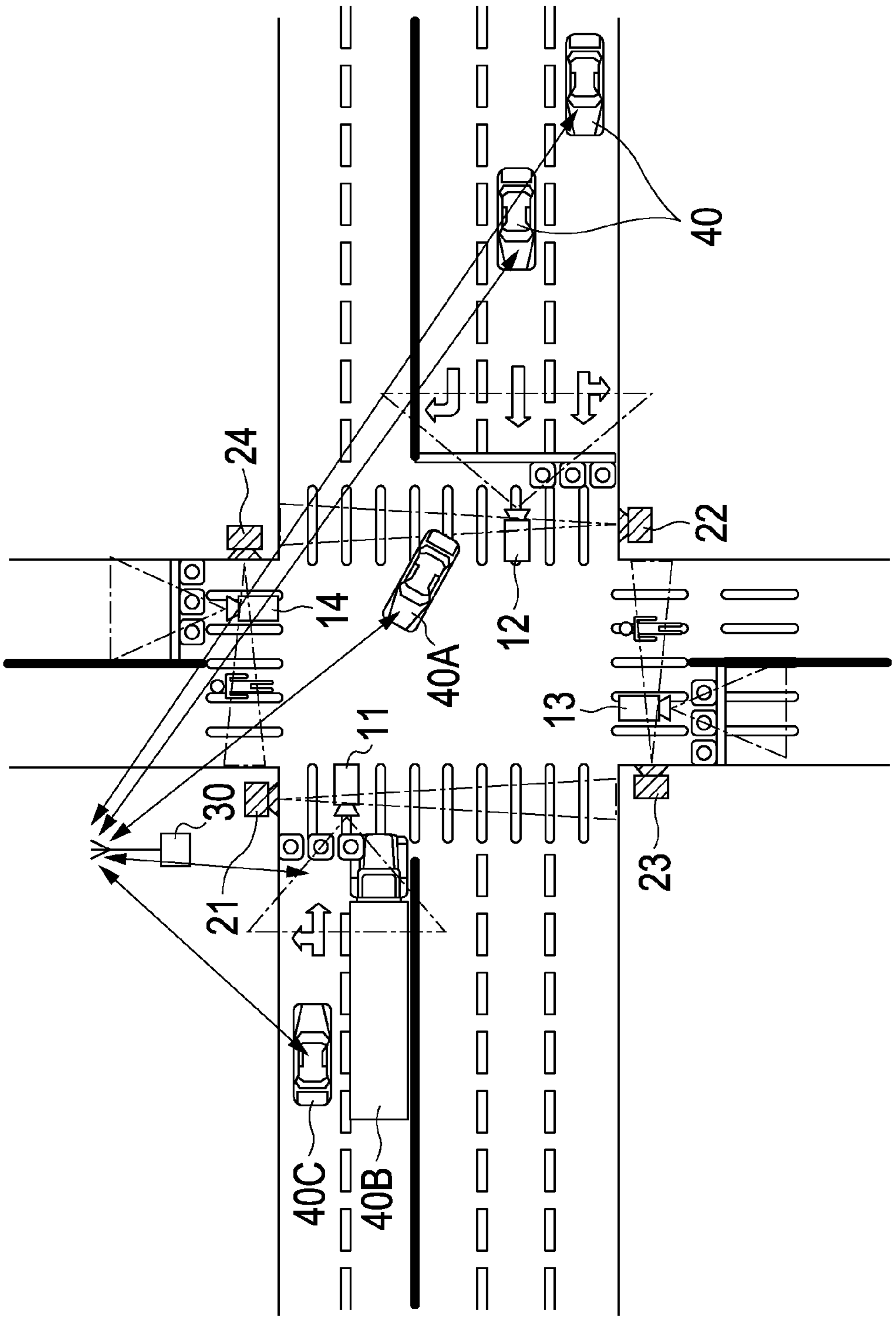
FIG. 1 is a diagram which illustrates an example of a driving support system which prevents traffic accidents around an intersection.
Figure 2:
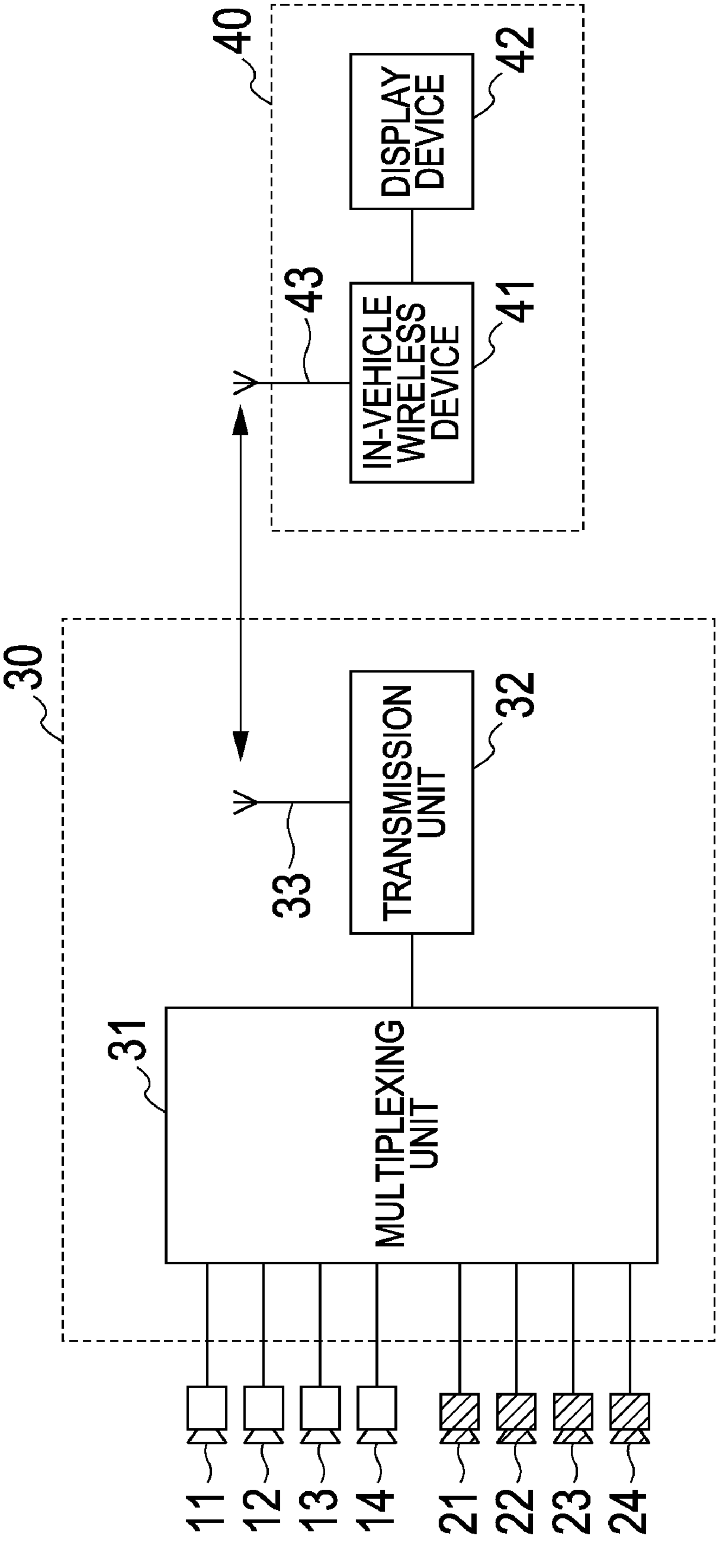
FIG. 2 is a block diagram which illustrates the driving support system illustrated in FIG. 1.
Figure 3:
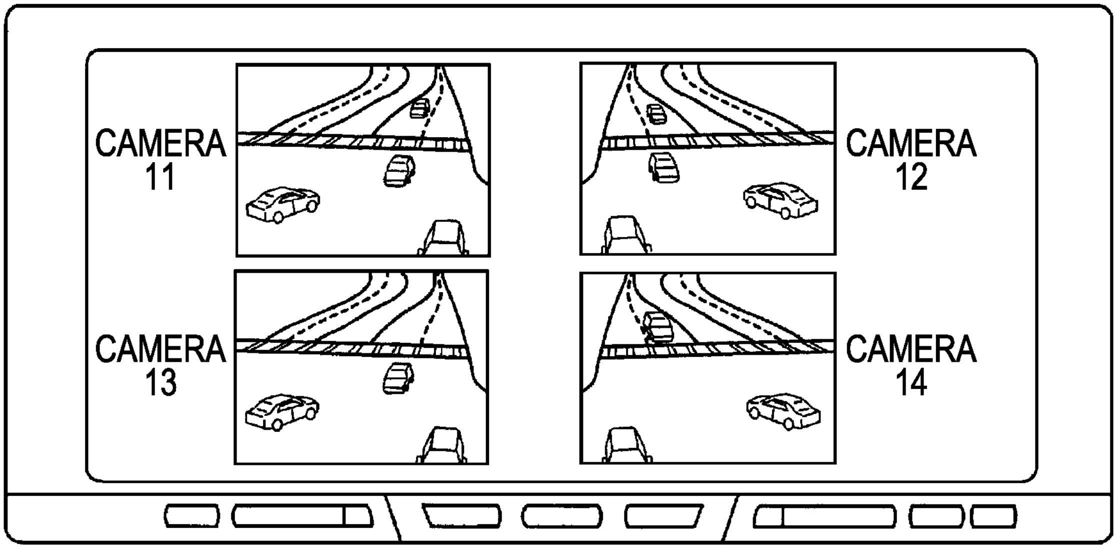
FIG. 3 is a diagram which illustrates an example of images displayed on a display device included in a vehicle.

For example, as a solving method, a structure may be conceived in which the infrastructure system detects vehicles running along respective traffic lanes, and transmits particular information to each vehicle according to the traffic lane on which it is running. For example, to the vehicle 40A which is just about to turn right as illustrated in FIG. 1, only the image acquired by the camera 11 is transmitted. Thus, such a structure allows the vehicle 40A to receive only necessary information, thereby transmitting only information that is useful for the driver. However, with such a structure in which such particular information is transmitted from the infrastructure system to each vehicle, the same information is transmitted to multiple vehicles, leading to poor efficiency. Accordingly, a structure is preferable in which the infrastructure system transmits multiple information as a single data set in a multi-address transmission manner, and each vehicle selects only the necessary information and displays the information thus selected.

Description will be made below regarding a specific embodiment with reference to the drawings.

Figure 4:
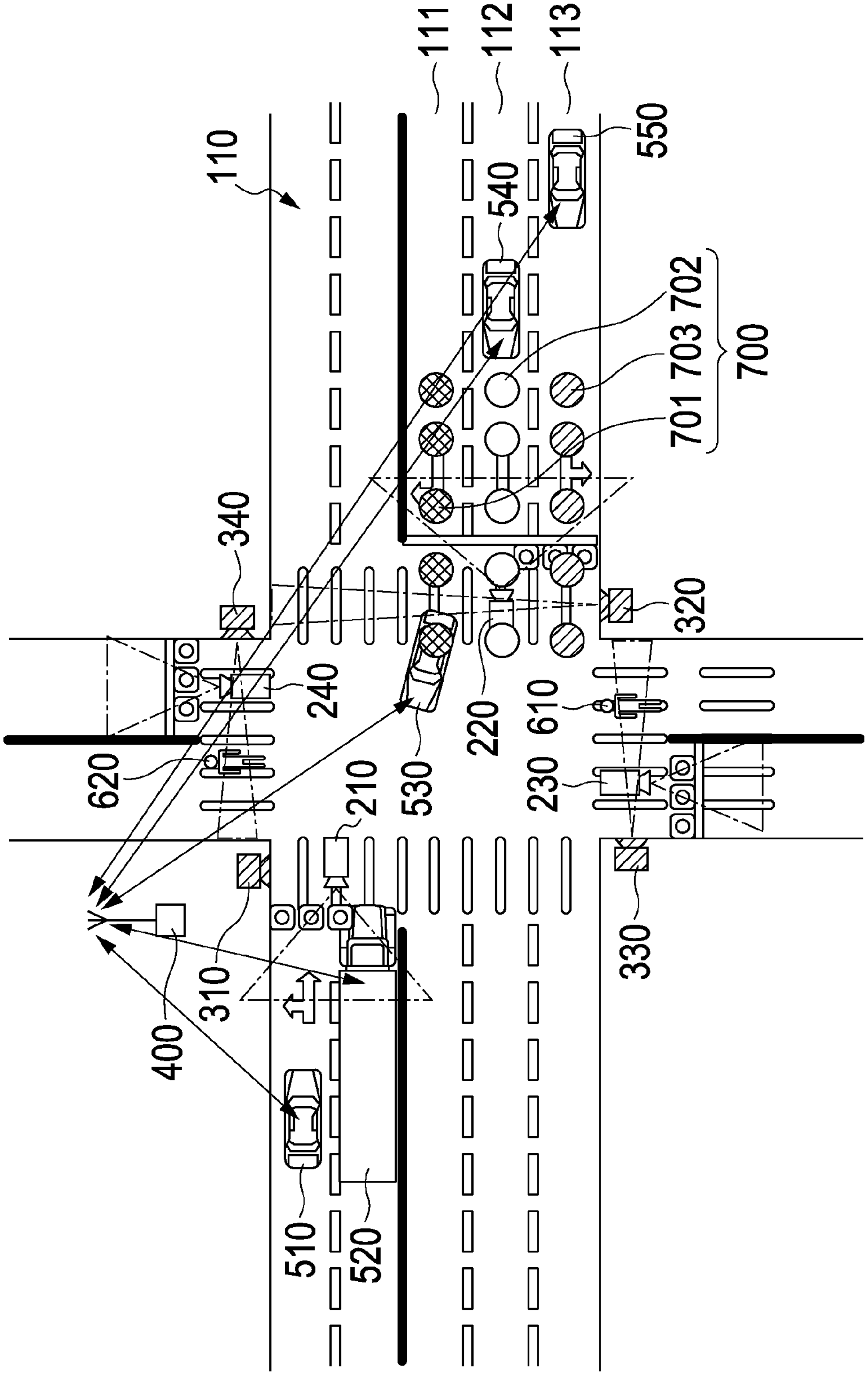
FIG. 4 is a diagram which illustrates the driving support system.

FIG. 4 is a diagram which illustrates an embodiment of a driving support system.

FIG. 4 illustrates: four cameras 210, 220, 230, and 240 which acquire images of the intersection zone from different fields of view; four pedestrian sensors 310, 320, 330, and 340 which detect pedestrians crossing at crosswalks; a transmission apparatus 400 which acquires the image data acquired by the cameras 210, 220, 230, and 240, and the pedestrian sensors 310, 320, 330, and 340, and transmits the data in a multi-address transmission manner; vehicles 510, 520, 530, 540, and 550, running along traffic lanes 110; and pedestrians 610 and 620 crossing the intersections. Each of the vehicles 510, 520, 530, 540, and 550 corresponds to the aforementioned moving object.

Furthermore, RFID tags 700, each of which stores tag information (which will be described later) that corresponds to the respective traffic lane 110, are embedded in the multiple traffic lanes 110 illustrated in FIG. 4. Each RFID tag corresponds to an example of the aforementioned transmission device.

Figure 5:
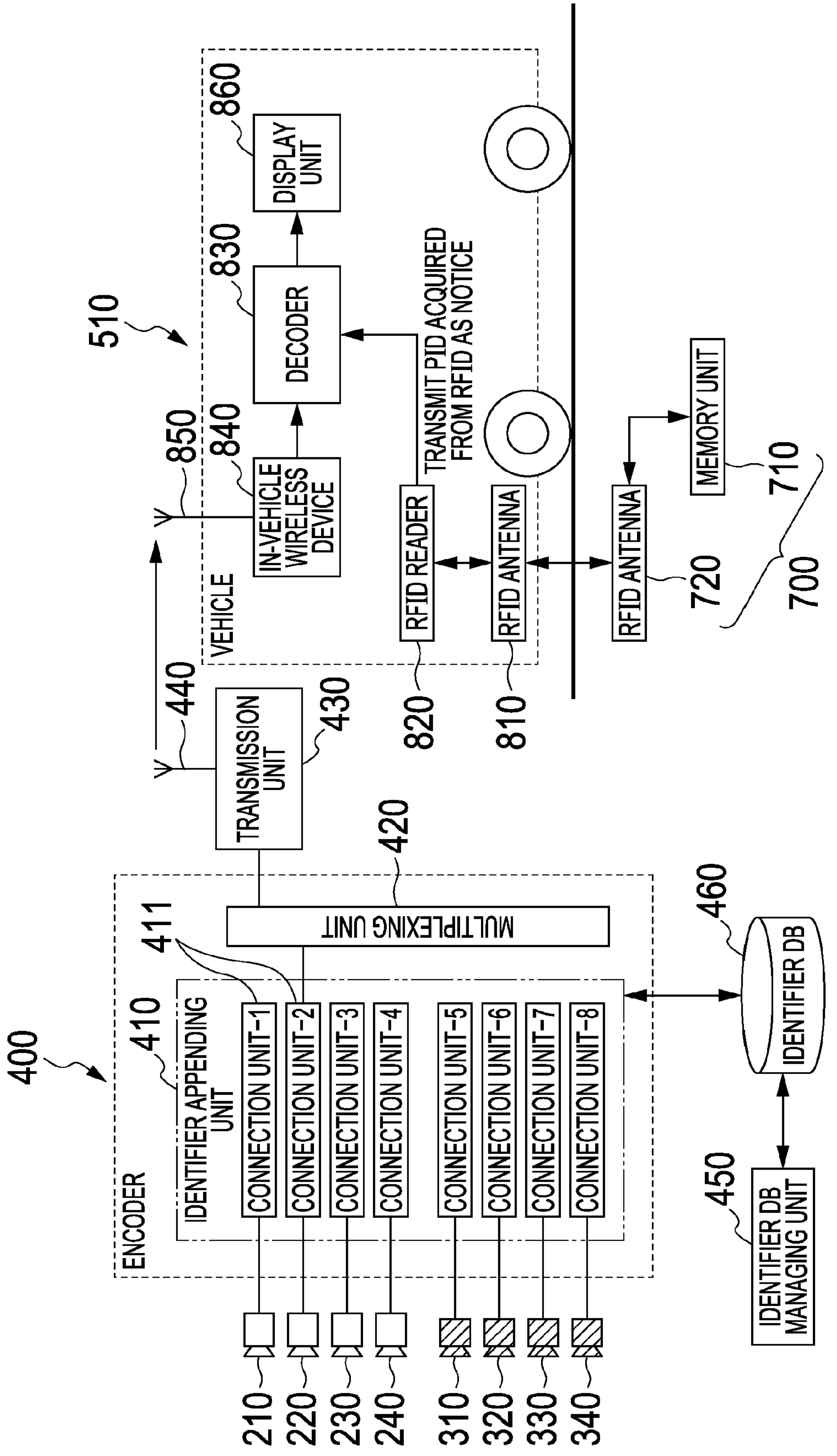
FIG. 5 is a schematic block diagram which illustrates the driving support system illustrated in FIG. 4.

FIG. 5 is a schematic block diagram which illustrates the driving support system illustrated in FIG. 4.

It should be noted that only the vehicle 510 is illustrated in FIG. 5, as a representative of the multiple vehicles 510, 520, 530, 540, and 550. Furthermore, FIG. 5 illustrates only the components of the wireless infrastructure device 400 and the vehicle 510 which are related to the driving support system.

The wireless infrastructure device 400 illustrated in FIG. 5 includes multiple connection units 411 numbered serially, and acquires video data from each of the cameras 210, 220, 230, and 240, and the pedestrian sensors 310, 320, 330, and 340. Furthermore, the wireless infrastructure device 400 includes an identifier appending unit 410 which appends a packet identifier (PID) to the respective video data so as to enable identification of the device which generates (acquires) the video data. Moreover, the wireless infrastructure device 400 includes: a multiplexing unit 420 which multiplexes the video data with the PIDs thus appended so as to generate multiplexed data; a transmitting device 430 which transmits, using an antenna 440 in a multi-address transmission manner, the multiplexed data thus generated by the multiplexing unit 420; an identifier DB which registers the PIDs which enables identification of each of the cameras 210, 220, 230, and 240, and the pedestrian sensors 310, 320, 330, and 340; and an identifier DB managing unit 450 which modifies, adds, and deletes PIDs.

Furthermore, the RFID tag 700 includes: a memory unit 710 which stores the tag information that corresponds to the traffic lane 110 in which the RFID tag 700 is embedded; and an antenna 720 which transmits the tag information stored in the memory unit 710. The vehicle 510 includes: an RFID reader 820 which reads out the tag information stored in the RFID tag 700 using an RFID tag antenna 810; a vehicle installation wireless device 840 which receives, using an antenna 850, the multiplexed data transmitted from the wireless infrastructure device 400 in a multi-address transmission manner; a decoder 830 which demultiplexes the multiplexed data into multiple video data; and a display unit 860 which displays video images etc., based upon the video data. A combination of the vehicle installation wireless device 840, the RFID reader 820, etc., which is mounted in the vehicle 510, corresponds to an example of the aforementioned reception device. Furthermore, the vehicle installation wireless device 840 corresponds to an example of the aforementioned first receiver, the RFID reader 820 corresponds to an example of the aforementioned first receiver, and the display unit 860 corresponds to an example of the aforementioned display unit.

Here, in the basic configuration of the aforementioned mobile support system, an application structure is preferably made in which the aforementioned transmission apparatus is a response generating device installed according to the road along which the moving object runs, and, the first receiver of the reception device mounted in the moving object is an inquiring device which receives the identification information from the response generating device.

By employing the RFID tags and the RFID readers, such a structure provides a mobile support system in a simple configuration. The RFID tag 700 corresponds to an example of the aforementioned response generating device, and the RFID reader 820 corresponds to an example of the aforementioned inquiring device.

Figure 6:
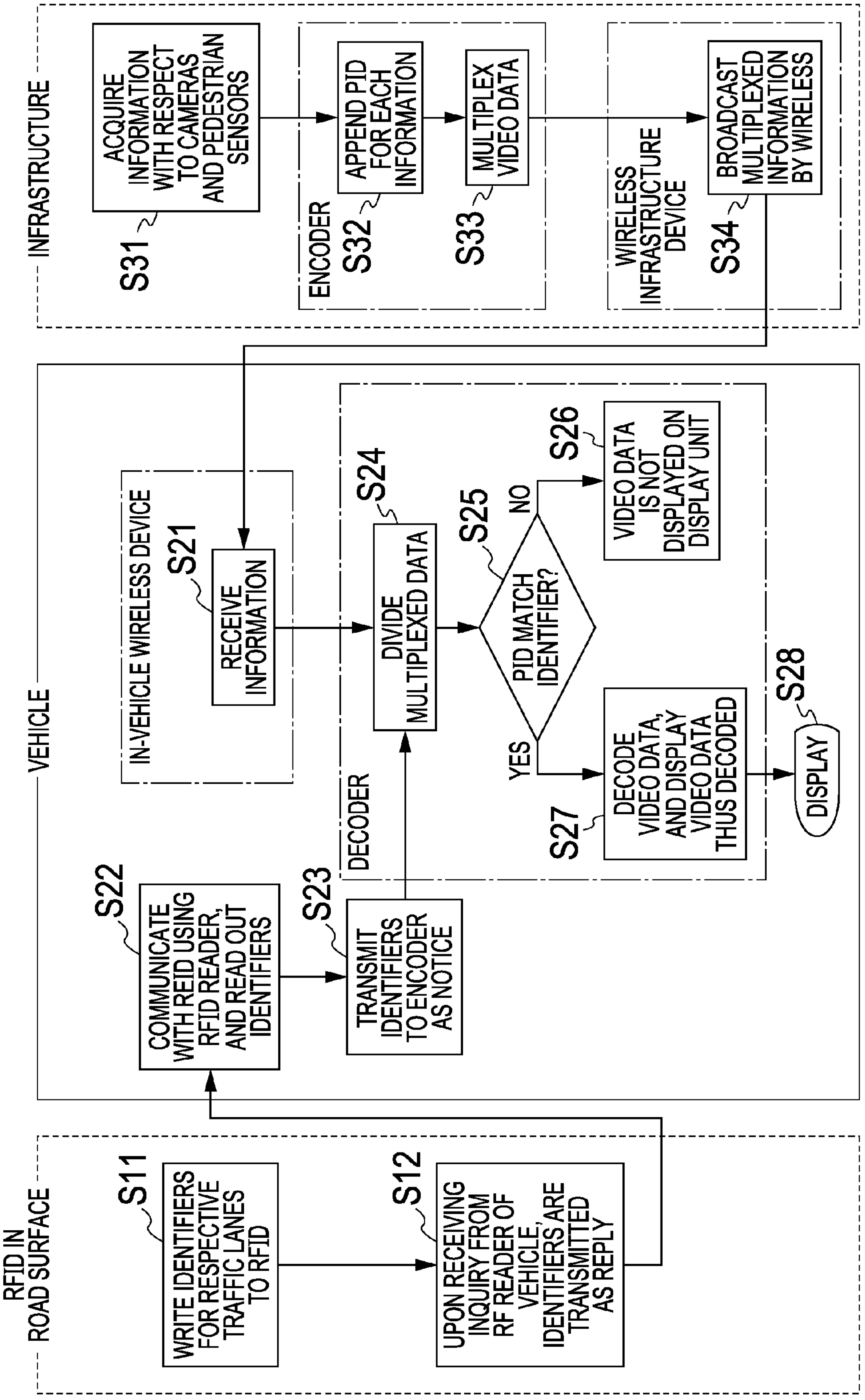
FIG. 6 is a flowchart which illustrates the flow of the processing performed in a RFID tag, the vehicle, and a wireless infrastructure device.

FIG. 6 is an example of a flowchart which illustrates the flow of the processing performed by the RFID tag 700, the vehicles 510, 520, 530, 540, and 550, and the wireless infrastructure device 400.

First, description will be made regarding the flow of the processing in the wireless infrastructure device 400.

The cameras 210, 220, 230, and 240 acquire images of the intersection zone from different fields of view. The pedestrian sensors 310, 320, 330, and 340 detect pedestrians crossing at crosswalks in the intersection zone (Step S31 in FIG. 6).

The multiple video data generated by the cameras 210, 220, 230, and 240, and the pedestrian sensors 310, 320, 330, and 340, are acquired by the multiple connection units 411 included in the identifier appending unit 410 of the wireless infrastructure device 400. The PIDs of the cameras 210, 220, 230, and 240, and the pedestrian sensors 310, 320, 330, and 340, which generate the video data, are appended to the multiple video data thus acquired (Step S32 in FIG. 6).

FIG. 7 is a diagram which illustrates an example of the PIDs registered in the identifier database (DB) 460.

A series of numbers assigned to the multiple connection units 411 and the PIDs which enable identification of the cameras 210, 220, 230, and 240, and the pedestrian sensors 310, 320, 330, and 340, connected to the respective connection units 411, is registered in the identifier database (DB) 460 in a mutually associated form. For example, the connection unit 411 denoted by the connection number "1" is associated with the PID of the camera 210, i.e., "0x1001". Accordingly, the PID of the camera 210, i.e., "0x1001", is appended to the video data acquired via the connection unit 411 denoted by the connection number "1".

The multiple video data with the PIDs thus appended are output to the multiplexing unit 420. The multiplexing unit 420 multiplexes the multiple video data so as to generate multiplexed data (Step S33 in FIG. 6).

FIGS. 8A-8D are a diagram which illustrate an example of the data structure of the video data and the multiplexed data. FIG. 8D illustrates a TPC/IP data packet including a data of FIG. 8C.

FIG. 8A illustrates the data structure of the video data generated by the cameras 210, 220, 230, and 240, and the pedestrian sensors 310, 320, 330, and 340. FIG. 8B illustrates the data structure of the video data with the appended PID. FIG. 8C illustrates the data structure of the video data portion of the multiplexed data obtained by multiplexing the multiple video data, and illustrates the data structure of the multiplexed data with multiple appended headers.

A video image header, which includes the PID of the device which generates the corresponding video data, is appended to the video data generated by the cameras 210, 220, 230, and 240, and the pedestrian sensors 310, 320, 330, and 340. The image data with the video image headers thus appended is multiplexed, and a header for transmission is further appended to the multiplexed video data, thereby generating multiplexed data. The multiplexed data thus generated is transmitted to the transmitting device 430, and is transmitted via the antenna 440 in a multi-address transmission manner (S34 in FIG. 6). It should be noted that the vehicle which receives the multiplexed data divides the multiplexed data into multiple video data, and checks the PIDs included in the video image headers of the video data, thereby determining, for the respective video data, which camera or pedestrian sensor acquired the video data, from among the cameras 210, 220, 230, and 240, and the pedestrian sensors 310, 320, 330, and 340.

The following is a description regarding the flow of the processing for the RFID tag 700.

Each of the PID's of the cameras 210, 220, 230, and 240, and the pedestrian sensors 310, 320, 330, and 340, which generate the video data useful for the drivers of the vehicles 510, 520, 530, 540, and 550 running along the traffic lanes 110 in which the RFID tags 700 have been embedded, are written to the RFID tags 700 (Step S11 in FIG. 6).

FIG. 9 is a diagram which illustrates an example of the tag information stored in the RFID tag 700.

In the example illustrated in FIG. 9, an RFID tag 701, which has been embedded in the traffic lane 111 along which the vehicle 530 that is about to turn right is running, stores the PID of the camera 210, i.e., "0x1001", and the PID of the pedestrian sensor 340, i.e., "0x1014", which acquire video images of the vehicles 510 and 520 and the pedestrian 620 which will interrupt the route along which the vehicle 530 is running. In the same way, an RFID tag 702, which has been embedded in the traffic lane 112 along which the vehicle 540 that is about to go straight ahead is running, stores the PID of the pedestrian sensor 310, i.e., "0x1011". An RFID tag 703, which has been embedded in the traffic lane 113 along which the vehicle 540 that is about to turn left is running, stores the PIDs of the pedestrian sensors 310 and 330, i.e., "0x1011" and "0x1013".

With such a structure, when an inquiry for the tag information stored in the RFID tag 700 is received via the RFID antenna 720 from the vehicles 510, 520, 530, 540, and 540, which are running along the traffic lanes 110, the tag information stored in the memory unit 710 is transmitted to the vehicles 510, 520, 530, 540, and 550, via the RFID tag 702, as a reply (S12 in FIG. 6). That is to say, each of the vehicles 510, 520, 530, 540, and 550 receives the PIDs as a reply, thereby enabling identification of the video data that corresponds to the traffic lanes 110 along which the vehicles are running.

The following is a description regarding the flow of the processing for the vehicles 510, 520, 530, 540, and 550.

The vehicle installation wireless device 840 included in each of the vehicles 510, 520, 530, 540, and 550 receives multiplexed data transmitted from the wireless infrastructure device 400 in a multi-address transmission manner (S21 in FIG. 6). The multiplexed data includes multiple video data generated by the cameras 210, 220, 230, and 240, and the pedestrian sensors 310, 320, 330, and 340.

With such a structure, when the vehicle approaches the intersection zone, the tag reader 800 reads out the tag information transmitted from the RFID tag 700 embedded in the traffic lane 110 along which it is running (Step S22 in FIG. 6). The tag information thus read out is transmitted to the decoder 830 (Step S23 in FIG. 6).

The decoder 830 divides the multiplexed data illustrated in FIG. 8C into multiple video data illustrated in FIG. 8B (Step S24 illustrated in FIG. 6).

Subsequently, comparison is sequentially made between the PIDs included in the respective video headers of the multiple video data thus divided and the PIDs included in the tag information read out from the RFID tag 700 (Step S25 in FIG. 6). In a case in which the PID of the video data does not match the PID included in the tag information (No; in Step S25 illustrated in FIG. 6), the video data is not transmitted to the display unit 860 (Step S26 in FIG. 6). Only in a case in which the PID of the video data matches the PID included in the tag information (Yes; in Step S27 in FIG. 6), the video data is transmitted to the display unit 860 (Yes; Step S27 in FIG. 6). By transmitting the camera IDs to the vehicle which is running along a particular line, such a structure is capable of effectively selecting only the video information useful for the vehicle which is running along the traffic vehicle, thereby preventing traffic accidents.

The display unit 860 displays the video images represented by the video data transmitted from the decoder 830 (Step S28 in FIG. 6).

Figure 10:
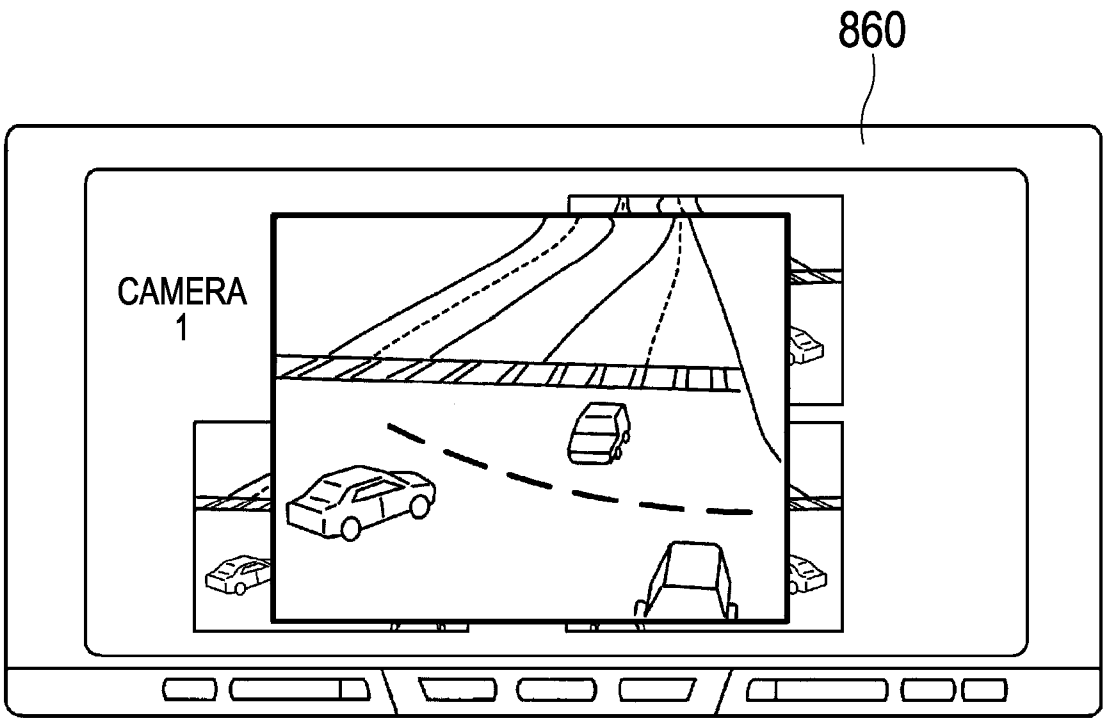
FIG. 10 is a diagram which illustrates an example of video images displayed on a display unit.

FIG. 10 is a diagram which illustrates an example of the video images displayed on the display unit 860.

Multiple video data generated by the cameras 210, 220, 230, and 240, and the pedestrian sensors 310, 320, 330, and 340 are transmitted to each of the vehicles 510, 520, 530, 540, and 550. As illustrated in FIG. 10, the display unit 860 displays, with a large size, only the video image that corresponds to the traffic lane 110 along which the corresponding vehicle 510, 520, 530, 540, or 550 is running. For example, in the vehicle 530 which is turning right as illustrated in FIG. 4, the video images generated by the pedestrian sensor 340 and the camera 210 are displayed. This allows the driver to notice the vehicle 510 behind the large-size vehicle 520 on the near side, thereby preventing a traffic accident.

Furthermore, in a case in which traffic regulation is made due to road work or the like, in some cases, the vehicle can run along other traffic lanes that differ from the normal traffic lane.

Figure 11:
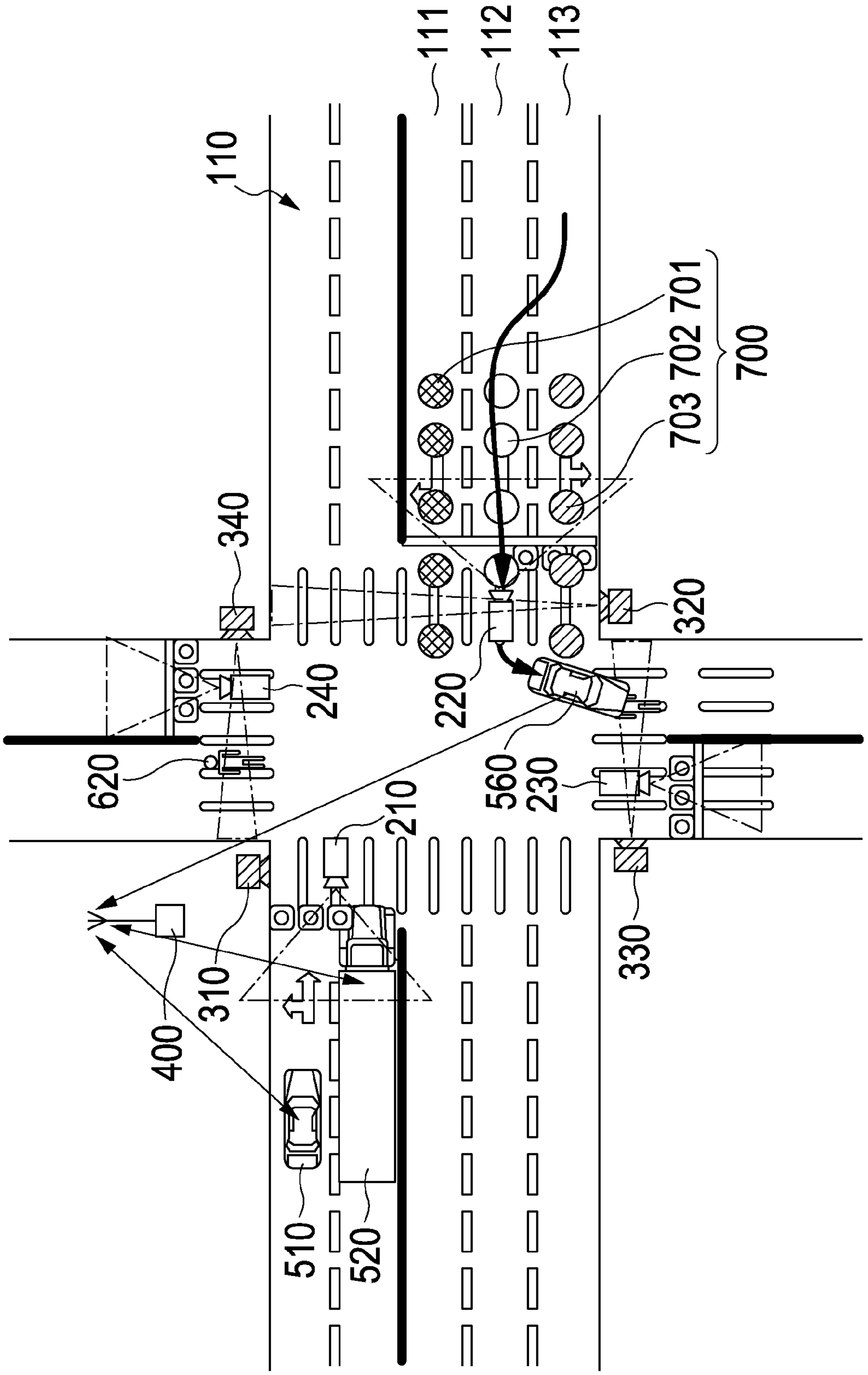
FIG. 11 is a diagram which illustrates the state in which traffic regulation has been applied to the traffic lane for left-turn, in the driving support system illustrated in FIG. 4.

FIG. 11 is a diagram which illustrates a situation in which, in the driving support system illustrated in FIG. 4, traffic regulation is applied to the traffic lane 113 for left-turn, for example.

As illustrated in FIG. 11, in a case in which the traffic regulation is applied to the traffic lane 113 for left-turn, the vehicle 560, which desires to turn left, turns left after passing through the traffic lane 112 for going straight ahead. Accordingly, the RFID tag 702 embedded in the traffic lane 112 is read out. In the present embodiment, for example, in a case in which the traffic regulation is made, the tag information stored in the RFID tag 702 embedded in the traffic lane 112 newly selected as a route along which the vehicle is to be driven is rewritten.

FIG. 12 is a diagram which illustrates an example of the tag information stored in the RFID tag 700.

As illustrated in FIG. 12, the RFID tag 702 embedded in the traffic lane 112 stores the PID of the pedestrian sensor 330, i.e., "0x1013", which has been stored in the RFID tag 703 embedded in the traffic lane 113 to which the traffic regulation has been applied, in addition to the PID of the pedestrian sensor 310, i.e., "0x1011" as with the RFID tag 702 illustrated in FIG. 9.

When the vehicle 560 illustrated in FIG. 11 turns left after passing through the traffic lane for going straight ahead, the vehicle 560 reads out the RFID tag 702 embedded in the traffic lane 112. Accordingly, the display unit 860 included in the vehicle 560 displays the video image acquired by the pedestrian sensor 330, which is useful when the vehicle is driven along the traffic lane 113 for left-turn, in addition to the video image acquired by the pedestrian sensor 310 which is useful when the vehicle is driven along the traffic lane 112 for going straight ahead. As described above, by rewriting the tag information stored in the RFID tag 702, such a structure is capable of handling such traffic regulation and so forth.

As described above, with the present embodiment, the direction of movement of each vehicle 560 can be detected using the tag information stored in the RFID tag 702, thereby providing information suitable for each driver.

Next, description will be made regarding a second embodiment. The driving support system according to the second embodiment has the same configuration as that of the driving support system according to the first embodiment. However, there is a difference in the data structure of the multiplexed data and the tag information between the first embodiment and the second embodiment. Accordingly, description will be made regarding the difference between the first embodiment and the second embodiment.

FIG. 13A is a diagram which illustrates the tag information stored in the RFID tag 700 and FIG. 13B is the identifiers registered in the identifier DB 460.

In the first embodiment illustrated in FIG. 9, the RFID tag 700 embedded in the traffic lane 110 stores the PIDs of the cameras and the pedestrian sensors which generate the video data to be displayed in each vehicle which is running along the traffic lane 110. As illustrated in FIG. 13A, in the present embodiment, each RFID tag 700 stores a traffic lane ID which enables identification of the corresponding traffic lane 110 on which each RFID tag 700 has been embedded.

Furthermore, as illustrated in FIG. 13A, in the wireless infrastructure device 400 according to the present embodiment, the identifier DB 460 stores a series of connection numbers assigned to the multiple connection units 411 and the PIDs which enables identification of the cameras 210, 220, 230, and 240, and the pedestrian sensors 310, 320, 330, and 340, connected to the respective connection units 411, in a mutually associated form. Moreover, the designation information which specifies the PIDs of the cameras and the pedestrian sensors which generate the video data to be displayed in each vehicle which is running along the corresponding traffic lane is associated with the connection number "0", for each of the traffic lane IDs assigned to the multiple traffic lanes 111. For example, for the traffic ID "0x1001" which represents the traffic lane 111 for right-turn illustrated in FIG. 11, the PID "0x1001" of the camera 210 and the PID "0x1014" of the pedestrian sensor 340, which are useful for the vehicle running along the traffic lane 111, are specified. For the traffic ID "0x1003" which represents the traffic lane 113 for left-turn, and which is under the traffic regulation, no PID is specified. For the traffic ID "0x1002" which represents the traffic lane 112 for going straight ahead, the PID "0x1013" of the pedestrian sensor 330 which is useful for the vehicle which is running along the traffic lane 113 under the traffic regulation is specified, in addition to the PID "0x1011" of the pedestrian sensor 310 which is useful for the vehicle which is running along the traffic lane 112.

With the wireless infrastructure device 400 according to the present embodiment, in the multiple connection units 411 included in the identifier appending unit 410, the PIDs of the cameras and the pedestrian sensors are appended to the respective video data generated by the cameras 210, 220, 230, and 240, and the pedestrian sensors 310, 320, 330, and 340. In addition, the designation information is handled as the "0'th" video data, and the PID "0x0000" which represents the designation data is appended to the designation information. That is to say, "0'th" video header including the PID "0x0000" and the designation information are further added before the "first" video data illustrated in FIG. 8C, thereby generating the multiplexed data.

Furthermore, with the vehicle according to the present embodiment, upon receiving the multiplexed data from the wireless infrastructure device 400, the tag information stored in the RFID tag 700 embedded in the traffic lane 110 along which it is running is read out, thereby acquiring the traffic lane ID. Furthermore, from among the multiple video data items which are components of the multiplexed data, the video data that corresponds to the PID assigned to the traffic lane ID thus acquired is selected based upon the designation information which is the "0'th" video data, and the video data thus selected is displayed.

Here, the above-described structure of the mobile support systems may include an application structure described below. The transmitting device transmits road information which specifies the road along which the moving object is running. The first receiver receives multiple information items with respect to the movement of the moving object including the information to be displayed in the moving object which is running along the road specified by the road information. The first receiver receives the road information. The display selects, based upon the road information thus received by the first receiver, a particular information item from among the multiple information items with respect to the movement of the moving object thus received, and displays the particular information thus selected.

Also, an structure may be made in which, instead of the PIDs of the cameras and the pedestrian sensors, the traffic lane IDs of the traffic lanes 110 in which the RFID tags 700 have been embedded are stored in the respective RFID tags 700, the traffic lane IDs are associated with the PIDs of the devices which acquire the video information to be displayed in the vehicles which are running along the respective traffic lanes 110, and the data thus associated is transmitted in addition to the video data, thereby allowing each vehicle side to select only the necessary video data in a sure manner. Furthermore, with the present embodiment, even in a case in which traffic regulation has been made due to road work or the like, only the designation information included in the multiplexed data distributed from the wireless infrastructure device 400 should be modified without a need of rewriting the tag information stored in the RFID tags 700 embedded in the traffic lanes 110, thereby facilitating the modification operation.

A third embodiment will be illustrated below. The driving support system according to the third embodiment has approximately the same configuration as that of the first embodiment. Accordingly, the same components are denoted by the same reference numerals, description thereof will be omitted, and description will be made only regarding the difference between the first embodiment and the third embodiment.

Figure 14:
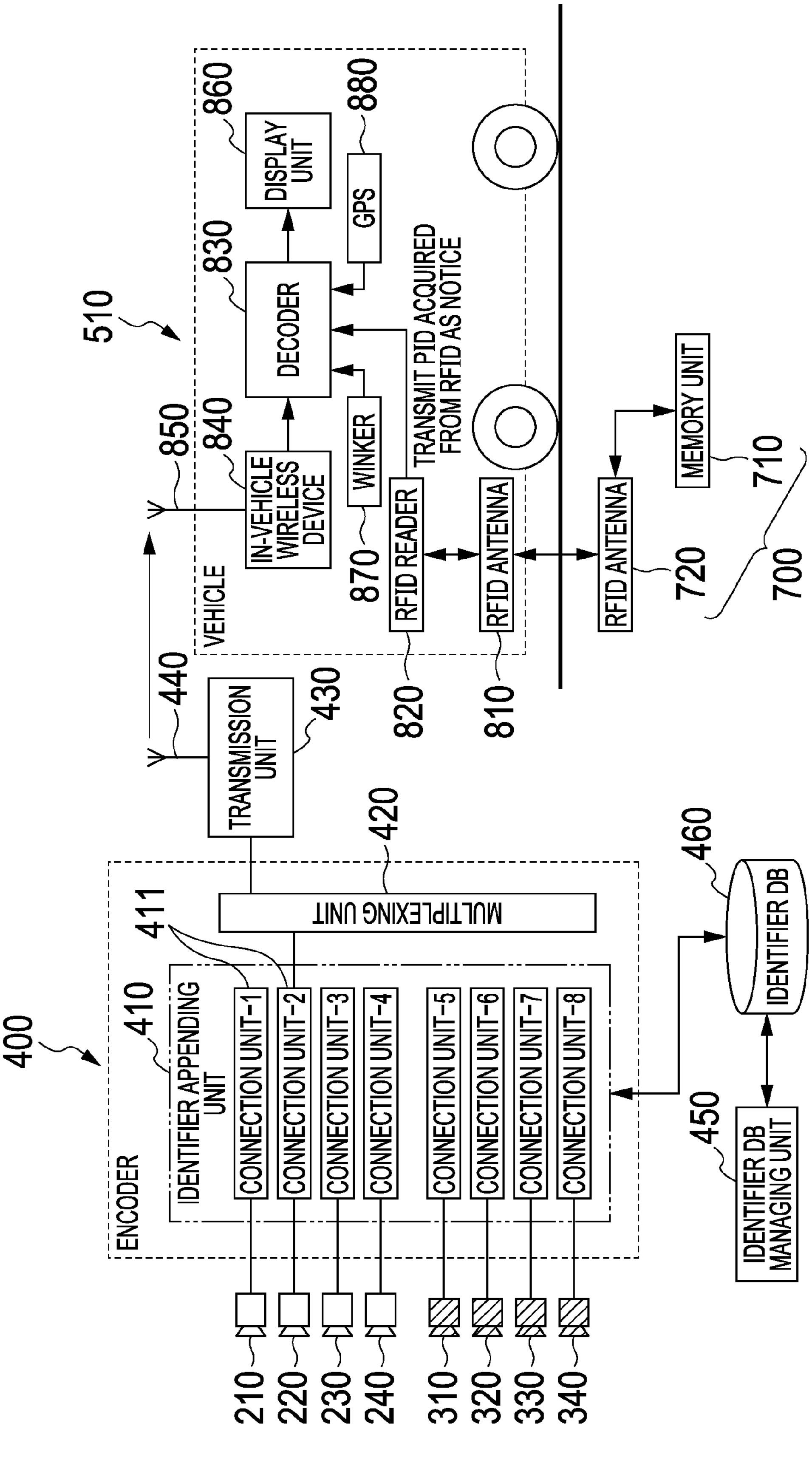
FIG. 14 is a block diagram which illustrates a driving support system according to a third embodiment.

FIG. 14 is a schematic block diagram which illustrates a driving support system according to the present embodiment.

As illustrated in FIG. 14, the driving support system according to the present embodiment mounts a GPS system 880 in which, upon inputting an destination, route guidance is provided for the destination thus input. Furthermore, upon operating a winker 870, the information with respect to the operating direction (left or right) is transmitted to the decoder 830 from the winker 870. Furthermore, when the vehicle 510 approaches the intersection, the predicted direction of movement (left, right, or straight) is transmitted to the decoder 830 from the GPS system 880.

FIG. 15 is a diagram which illustrates the tag information stored in the RFID tags 700.

The RFID tags 700 according to the present embodiment store the PIDs of the cameras 210, 220, 230, and 240, and the pedestrian sensors 310, 320, 330, and 340, which generate the video images which are useful for the vehicles which are running in the direction of movement, for each of the directions of movement in which the vehicles are running along the traffic lanes 110 in which the RFID tags 700 have been embedded.

When the vehicle 510 reads out the tag information stored in the RFID tag 700 embedded in the traffic lane 110 along which it is running, of the PIDs included in the tag information, the vehicle 510 acquires the PIDs that correspond to the predicted direction of movement transmitted from the GPS system 880 or the winker 870. Furthermore, at the decoder 830, the multiplexed data is divided into multiple video data. From among the multiple video data items thus divided, the video data that correspond to the PIDs thus acquired is selected, and the video data thus selected is displayed on the display unit 860.

For example, in a case in which the vehicle 510 is running along the traffic lane 111 for right-turn, and the winker 870 or the GPS system 880 transmits information which indicates that the predicted direction of movement is "left", it is predicted that the vehicle 510 will move to the traffic lane 112 for going straight ahead. Accordingly, based upon the tag information read out from the RFID tag 701 illustrated in FIG. 14, the video data that corresponds to the PID "0x1011" associated with the predicted direction of movement "left" is selected. In this case, the display unit 860 included in the vehicle 510 displays the video image acquired by the pedestrian sensor 310 which is useful for the vehicle which is running along the traffic lane 112. This allows the driver to notice a pedestrian or the like behind the large-size vehicle 520, thereby preventing a traffic accident.

Here, the above-described structure of the mobile support systems may include an application structure described below. The transmitting device transmits road information which specifies the running direction of the moving object. The first receiver receives multiple information items with respect to the movement of the moving object including the information to be displayed in the moving object which is moving in the running direction specified by the road information. The first receiver receives the road information. The display selects, based upon the road information thus received by the first receiver, a particular information item from among the multiple information items with respect to the movement of the moving object thus received, and displays the particular information thus selected.

Based upon the winker operation, such a structure is capable of predicting the running direction of the vehicle even if it has no GPS system or the like. Furthermore, by employing the GPS system, such the structure is capable of predicting the running direction thereof with high precision.

As described above, with the present embodiment, a video image that corresponds to the running direction is displayed on a display unit included in the vehicle. This displays an image which is useful for the driver, thereby preventing occurrence of an accident.

Description has been made above regarding a structure in which the running direction is predicted using the GPS or the winker. Also, a structure may be made in which the running direction is predicted based upon the driver's steering operation.

Description has been made above regarding a structure which allows the vehicle, using the RFID tags, to identify the cameras and so forth which acquire the target images. Also, a structure may be made in which the traffic lane along which the vehicle is running is identified based upon the position information obtained by the GPS system, and the video images acquired by the cameras that correspond to the traffic lane thus identified are displayed.

As discussed above embodiments including for example the reception apparatus, the data display method, and the mobile object support system disclosed in this specification, may provide suitable information to the driver driving the mobile object.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus mounted on a mobile object, the apparatus comprising:

a first receiver configured to receive plural pieces of surrounding information regarding behavior of one or more objects around the mobile object traveling on a road;

a second receiver configured to receive mobile object information associated with a current position of the mobile object, the mobile object information including first identifier information identifying at least one piece of surrounding information in association with second identifier information identifying a traffic lane along which the mobile object is traveling; and a display configured to display the plural pieces of surrounding information, wherein the apparatus selects, from among the plural pieces of surrounding information, the at least one piece of the surrounding information identified by the first identifier information that is associated with the second identifier information identifying the traffic lane along which the mobile object is traveling; and the apparatus displays, on the display, the selected at least one piece of surrounding information in preference to the plural pieces of surrounding information.

2. The apparatus of the claim 1, wherein the plural pieces of surrounding information include one or more pieces of image information that are acquired from different fields of view.

3. A data displaying method for an apparatus mounted on a mobile object, the data displaying method comprising:

receiving plural pieces of surrounding information regarding behavior of one or more objects around the mobile object traveling on a road;

receiving mobile object information associated with a current position of the mobile object, the mobile object information including first identifier information identifying at least one piece of surrounding information in association with second identifier information identifying a traffic lane along which the mobile object is traveling, the at least one pieces of surrounding information being useful for the mobile object traveling along the traffic lane;

selecting, from among the plural pieces of surrounding information, the at least one piece of surrounding information identified by the first identifier information that is associated with the second identifier information identifying the traffic lane along which the mobile object is traveling; and displaying the selected at least one piece of surrounding information in preference to the plural pieces of surrounding information.

4. A mobile object supporting system for supporting travel of a mobile object on a road, the mobile object support system comprising:

a transmitting device including a transmitter configured to transmit mobile object information to the mobile object traveling on the road, the mobile object information including first identifier information identifying at least one piece of surrounding information in association with second identifier information identifying a traffic lane along which the mobile object is traveling, the at least one pieces of surrounding information being useful for the mobile object traveling along the traffic lane; and a receiving device provided for the mobile object, including:

a first receiver to receive plural pieces of surrounding information regarding behavior of one or more objects around the mobile object;

a second receiver to receive mobile object information associated with a current position of the mobile object; and a display to display the plural pieces of surrounding information, wherein the receiving device selects, from among the plural pieces of surrounding information, the at least one piece of surrounding information identified by the first identifier information that is associated with the second identifier information identifying the traffic lane along which the mobile object is traveling; and the receiving device displays, on the display, the selected at least one piece of surrounding information in preference to the plural pieces of surrounding information.

5. The mobile object supporting system of the claim 4, wherein the plural pieces of surrounding information include plural pieces of image information that are acquired from different fields of view.

6. The mobile object supporting system of the claim 4, wherein the transmitting device is located in the traffic lane along which the mobile object is travelling.

7. The mobile object supporting system of the claim 4, wherein the mobile object information further includes prediction information that is assigned to the at least one pieces of surrounding information identified by the mobile object information, the prediction information identifying a predicted direction of movement of the mobile object traveling along the traffic lane;

the receiving device provided for the mobile object selects the at least one piece of surrounding information identified by the mobile object information, from among the plural pieces of surrounding information, when the mobile object is predicted to move in a direction identified by the prediction information assigned to the at least one piece of surrounding information; and the receiving device displays, on the display, the selected at least one piece of surrounding information, in preference to the plural pieces of surrounding information.

* * * * *